United States Patent [19]

Davy

[11] Patent Number: 4,513,770

[45] Date of Patent: Apr. 30, 1985

[54] FLOW CONTROL VALVE

[75] Inventor: Philip A. Davy, Horsham, England

[73] Assignee: APV International Limited, Crawley, England

[21] Appl. No.: 451,489

[22] Filed: Dec. 20, 1982

Related U.S. Application Data

[63] Continuation-in-part of Ser. No. 274,754, Jun. 18, 1981, abandoned.

[51] Int. Cl.³ .................. F16K 43/00; F16K 41/00
[52] U.S. Cl. .................................. 137/315; 251/214; 277/152; 277/183
[58] Field of Search ............... 137/315; 251/214, 215, 251/318; 277/152, 182, 183, 193, 195

[56] References Cited

U.S. PATENT DOCUMENTS

| | | | |
|---|---|---|---|
| 2,600,293 | 6/1952 | Heldal | 277/152 |
| 3,327,992 | 6/1967 | Billeter et al. | 251/214 |
| 3,506,239 | 4/1970 | Johnson | 251/214 |
| 3,743,305 | 7/1973 | Berens et al. | 277/189 |
| 3,804,217 | 4/1974 | Keijzer | 277/183 |
| 3,843,139 | 10/1974 | Messenger | 277/183 |
| 4,055,352 | 10/1977 | Allinquant et al. | 277/152 |

FOREIGN PATENT DOCUMENTS

| | | | |
|---|---|---|---|
| 2709000 | 9/1978 | Fed. Rep. of Germany | 277/152 |
| 1928245 | 3/1982 | France | 277/152 |

Primary Examiner—George L. Walton
Attorney, Agent, or Firm—Christel, Bean & Linihan

[57] ABSTRACT

Shaft seals of the lip type with a sealing member bonded to an apertured insert have a tendency to form blisters in the sealing member near the bond. In order to avoid this, and provide a seal suitable for use in hygienic environments, the sealing member is mechanically engaged with the insert, for example, by being in the general form of a grommet with a central boss filling in the aperture and carrying the sealing lips, and having a wide radial flange forming a cleanable face exposed to the process fluid and a narrow deformable flange adapted to pass through the aperture of the insert and to expand into mechanical engagement therewith.

4 Claims, 5 Drawing Figures

FLOW CONTROL VALVE

This application is a continuation-in-part of my application Ser. No. 274,754, filed June 18, 1981 and now abandoned.

This invention relates to shaft seals of the lip type in which a resilient sealing member has a pair of lips longitudinally spaced along a shaft with which a seal is formed.

Such seals are conveniently used, inter alia, around the operating shafts of flow control valves. The use of lips is advantageous since the sealing force increases with the operating pressure. Also, it is possible to form the lip seal as a hygienic, crevice-free-construction suitable for use in the food processing industry. In order to prevent the whole seal from deforming in the form of a bellows, the lips are normally formed on a sealing member moulded onto a metal insert.

U.S. Pat. No. 3,804,217 to John H. Keijzer and Willy R. J. Pierle issued Apr. 16, 1974, relates to a pressurised shock absorber and shows a shaft seal of a double lip type having a wide flange on the side exposed to atmosphere. The wide flange is pinched between a retaining element or insert and is spun over the end of a casing for the shock absorber, and is therefore not readily replaceable nor is the wide flange presenting a clean face to the interior of the shock absorber. The mode of attachment of the seal to the retaining element or insert is not described.

Conventionally, the lip seal for a flow control valve is produced by compression of rubber onto a stainless steel insert which has been previously prepared by degreasing, glass-blasting and finally coated with a suitable bonding agent, to effect good adhesion between the rubber and the insert.

Despite this preparation, and despite experimentation with various rubber compounds and bonding agents to achieve optimum bonding, failures of the lip seals have occurred due to blistering close to the rubber/bond interface at temperatures above 90° C.

This blistering phenomenon persisted when a transfer moulded design was tested although the bond was improved.

In order to improve blistering, trials have been carried out using high permeability rubber, low integrity bonds and sintered, and therefore porous, inserts.

It has however been rather surprisingly found that the best results have been obtained by avoiding a bond between the sealing member and the insert, and instead relying on mechanical retention.

In accordance with the present invention, there is provided a flow control valve having a casing made up from separable casing parts, a flow control member mounted on a shaft axially movable in the said casing, a shaft seal mounted between two separable casing parts and cooperable with the said shaft to isolate the interior of the casing, the said shaft seal comprising an insert having opposed faces and a resilient sealing member supported by the insert and having a pair of spaced sealing lips axially spaced along the shaft; the improvement that the sealing member includes a central boss carrying the spaced sealing lips and also a narrow radial flange and a wide radial flange mechanically inter-engaging on the insert, with the wide flange fitting flat against and covering the face of the insert on the interior side of the seal, and the insert and wide flange being trapped between the casing parts to present a substantially flat hygienic face to the interior of the valve casing.

The sealing member thus takes on the general structure of a grommet with wide and narrow flanges. The wide flange presents a full face to the process fluid and is thus crevice-free and wholly cleanable. This makes it suitable for use in the food industry.

It will also be appreciated that the absence of a bond between the sealing member and the insert avoids the problems of blistering between the sealing member and the insert.

Preferably the sealing member is readily replaceable on the insert. This has the advantage that if the seal should fail for any reason, a new sealing member can be supplied far more cheaply than the complete shaft seal. Also, the rubber or other elastic material used for the sealing member may be readily chosen for compatibility with or resistance to particular process fluids to which the seal is likely to be exposed.

Since the elastomeric material has no longer to be bonded to the insert, the range of choice is much wider. Also, the sealing members can now be manufactured separately from the inserts, which simplifies manufacturing procedures and eliminates possible bottle necks in production due to shortage of inserts.

The invention will be further described with reference to the accompanying drawing, in which.

Figure 1:
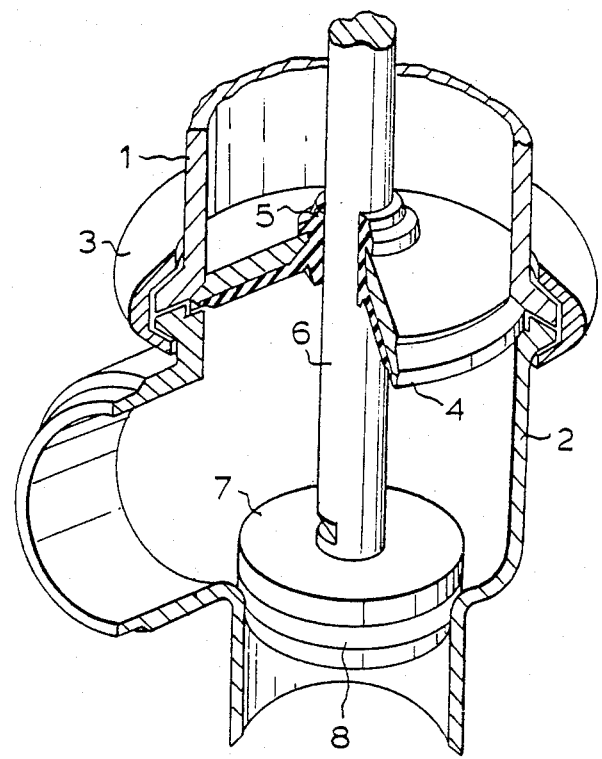
FIG. 1 is a cut away perspective view of a face of the valve incorporating the invention.

Turning first to FIG. 1, there is shown a typical flow control valve, e.g. an air operated flow control valve, including a shaft seal of the novel type. The valve includes a casing having aligned parts 1 and 2 drawn together by a clamping ring 3 and trapping between them a shaft seal consisting of an insert 4 and a resilient sealing member 5 to be described in more detail below. The valve has an operating shaft 6 axially movable in sealing relationship with the sealing member 5 and this shaft 6 carries a flow control member 7 having a sealing part 8 cooperable with a seat formed in the casing.

Figure 2:
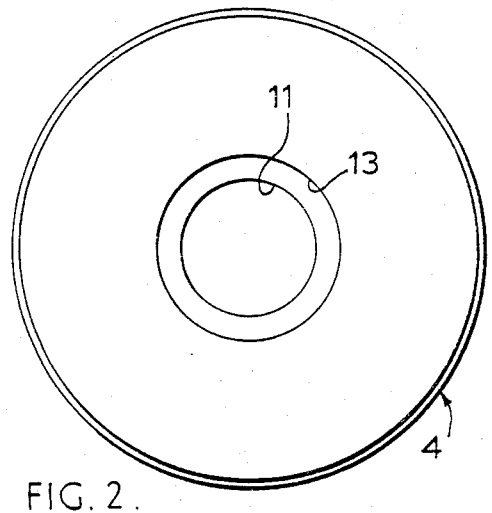
FIG. 2 is one end elevation of an insert forming part of a preferred form of shaft seal.
Figure 3:
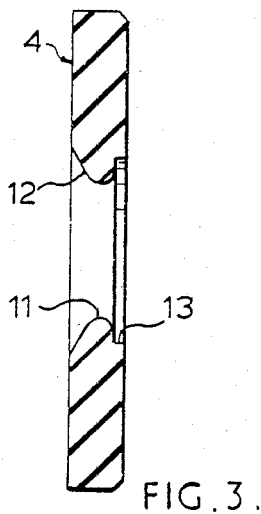
FIG. 3 is a sectional view of the insert of FIG. 2.

Referring now to FIGS. 2 and 3, the reinforcing insert 4 is shown as having a central aperture 11 to receive the operating shaft 6 with a comparatively small clearance. On the process side of the aperture 11, there is a lead-in surface 12, and on the opposite or atmosphere side there is provided a rebate 13.

Figure 4:
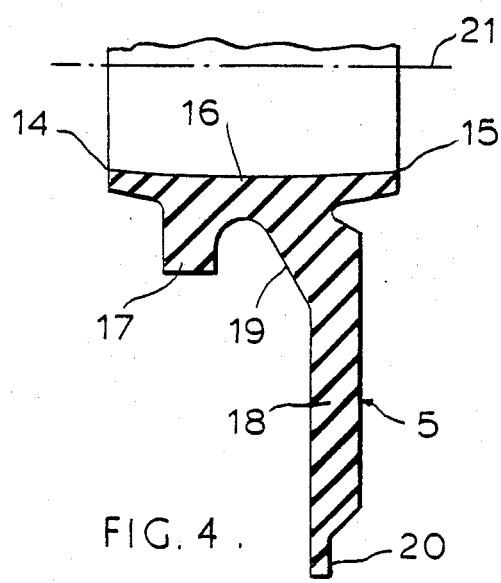
FIG. 4 is a partial section of the sealing member.

FIG. 4 shows, to a somewhat enlarged scale, a partial section of the resilient sealing member 5 to be fitted in the aperture 11 to provide a pair of sealing lips 14 and 15 for engaging on the operating shaft 6 of which the axis is shown chain-dotted at 21. The lips 14 and 15 are formed as part of a central boss 16 of the sealing member, and from this boss there projects a first and narrow radial flange 17 which fits in the rebate 13. A second and wider radial flange 18 projects from the boss and fits on and covers the process fluid side of the insert 4 and has an inclined internal surface 19 matching the lead-in surface 12. It will be seen that the resilient sealing member 5 of FIG. 4 may be fairly readily fitted to and removed from the insert 4 of FIGS. 2 and 3 since the central boss can be deformed sufficiently to allow the narrow flange 17 to pass through the aperture 11 and then to expand into engagement with the rebate 13. The wider flange 18 then fits flat against the covers the adjacent surface of the insert 4, and also presents a cleanable and crevice-free surface to the process fluid within the casing. A reduced thickness circumferential zone 20 is provided to be trapped in the casing of the valve, in conjunction with the insert, as shown in FIG. 1.

Figure 5:
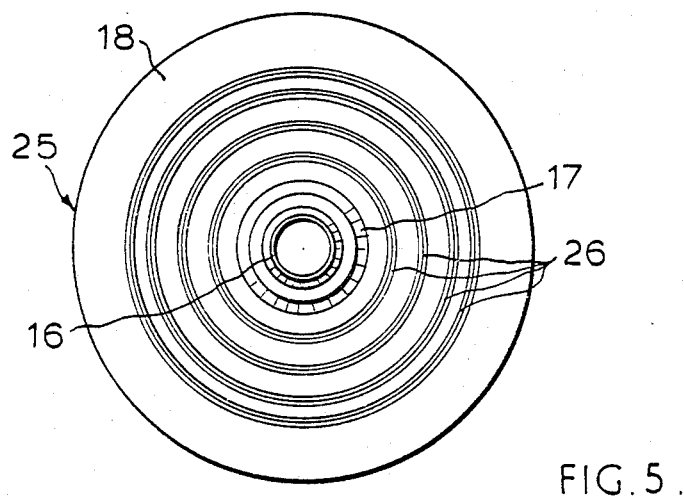
FIG. 5 is a rear elevation of a modified form of sealing member.

FIG. 5 shows an alternative form of sealing member 25. On the side of the wider flange 18 facing the insert, i.e. not presented to the process fluid, the member 25 is provided with a series of concentric grooves 26. These grooves 26 present lines along with the sealing member 25 may be easily cut to fit standard smaller sizes of inserts, so that a common type of sealing mechanism may be used with any of a number of standard size of insert by enabling cutting to size. FIG. 5 also shows the narrow flange 17 protruding from the central boss 16.

Various other modifications may be made within the scope of the invention.

I claim:

1. In a flow control valve having a casing made up from at least two separable casing parts, a flow control member mounted on a shaft axially movable in the said casing, a shaft seal mounted between said two of said separable casing parts and cooperable with the said shaft to isolate the interior of the casing, the said shaft seal comprising an insert having opposed faces and a resilient sealing member supported by the insert and having a pair of spaced sealing lips axially spaced along the shaft: the improvement that the sealing member includes a central boss carrying the spaced sealing lips and also a narrow radial flange and a wide radial flange mechanically inter-engaging on and about an inner edge of the insert, with the wide flange fitting flat against and covering the face of the insert on the interior side of the seal, and the insert and wide flange having peripheral edges located and trapped between the said two separable casing parts to present a substantially flat hygienic face of the wide flange to the interior of the valve casing with the insert isolated from the interior of the valve casing and fluid flow therethrough.

2. A flow control valve as claimed in claim 1, in which the sealing member is readily replaceable on the insert.

3. A flow control valve as claimed in claim 1, in which the wide radial flange has a circumferential zone of reduced thickness, which zone includes said peripheral edge located and trapped between the said casing parts.

4. A flow control valve as claimed in claim 1, in which the side of the wide flange of the sealing member facing the insert is provided with concentric grooves to enable the wide flange to be readily adapted to any of a variety of inserts.

* * * * *